Jan. 31, 1933.                W. C. BROWN                    1,895,750
                                VEHICLE
                      Filed April 22, 1929    2 Sheets-Sheet 1
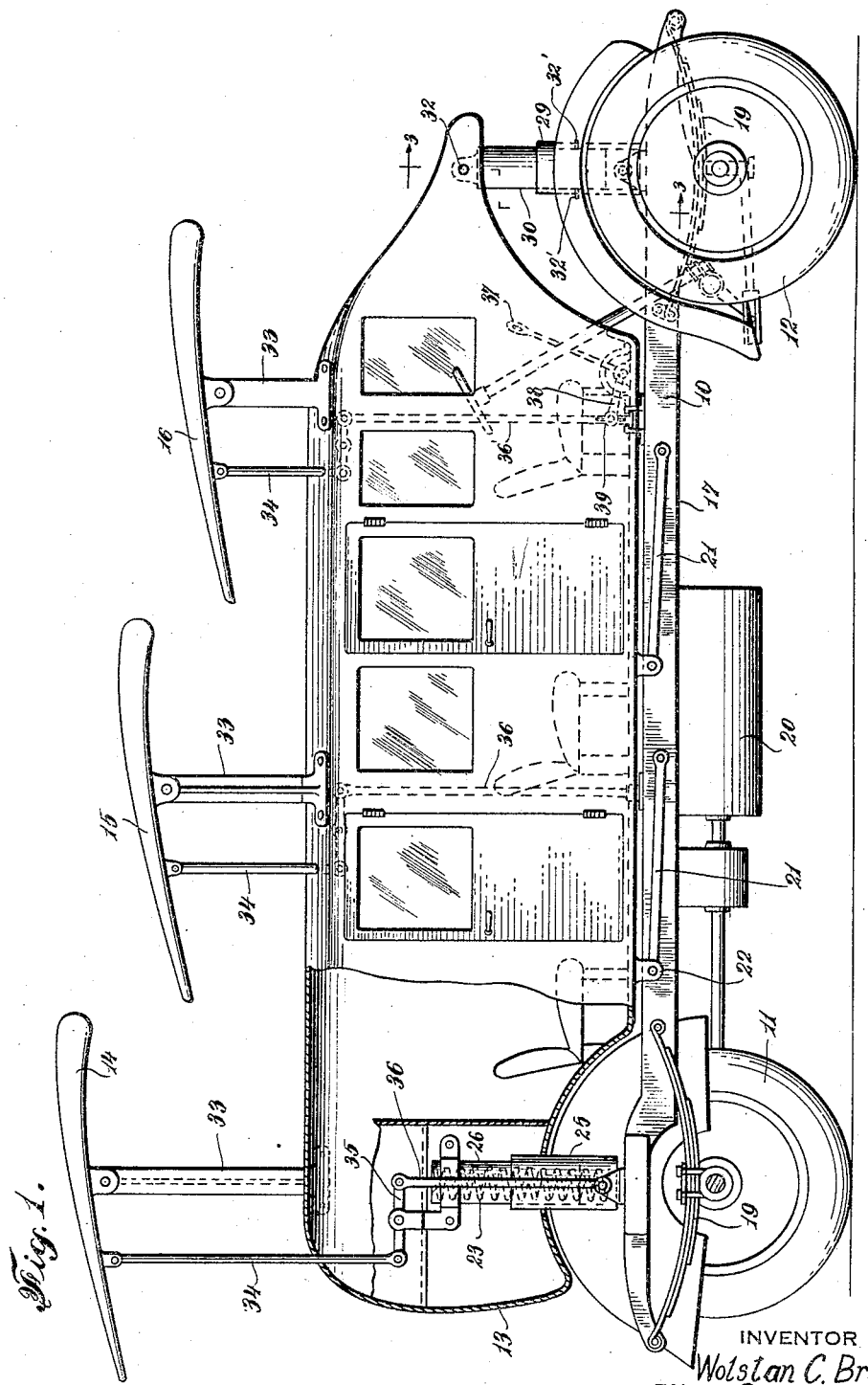
INVENTOR
Wolstan C. Brown.
BY
ATTORNEY Jan. 31, 1933. W. C. BROWN 1,895,750
VEHICLE
Filed April 22, 1929 2 Sheets-Sheet 2
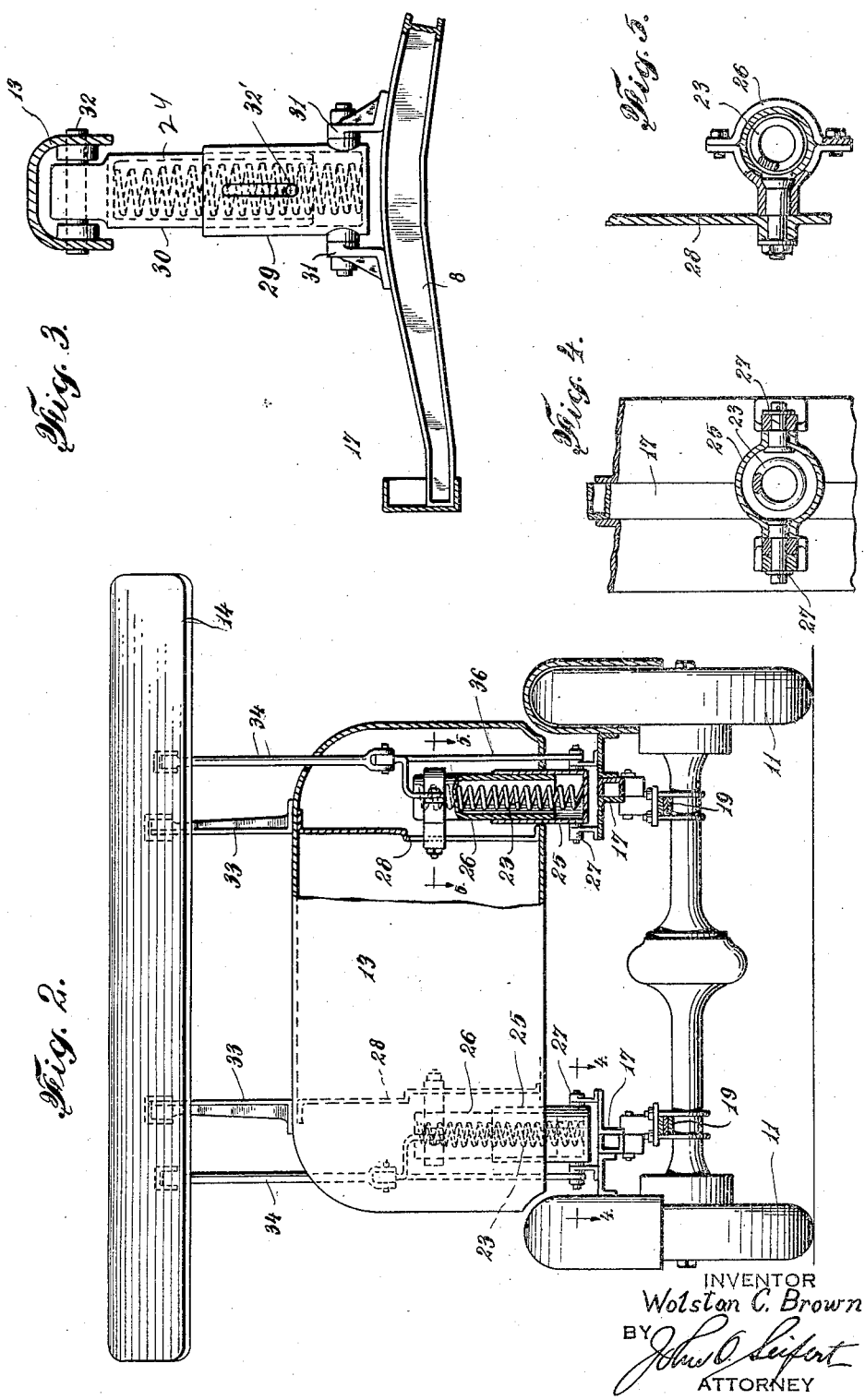
INVENTOR
Wolston C. Brown.
BY
ATTORNEY Patented Jan. 31, 1933

1,895,750

UNITED STATES PATENT OFFICE

WOLSTAN C. BROWN, OF NEW YORK, N. Y.

VEHICLE

Application filed April 22, 1929. Serial No. 356,946.

This invention relates to vehicles and aims to provide, in an automotive road vehicle, a maximum of comfort for the passengers, and maximum of safety particularly at high speeds.

In accordance with the invention, these objects are attained by combining, in a vehicle, a motor-driven wheel-borne chassis and a separable wholly or partly air-borne body.

Other objects and advantages of the invention are hereinafter explained in connection with a detailed description of a specific vehicle embodying the invention and shown in the accompanying drawings, in which:

Fig. 1 is a side view of the vehicle with parts of the body broken away;

Fig. 2 is a rear view of the vehicle with parts broken away and parts in section;

Fig. 3 is an enlarged fragmentary transverse section taken on the line 3—3 of Fig. 1; and Figs. 4 and 5 are enlarged fragmentary horizontal sections taken on the lines 4—4 and 5—5 of Fig. 2 respectively.

The vehicle shown has a chassis 10 mounted on wheels 11, 12 and a separable body 13 provided on its top with aerofoils 14, 15, 16 which, when the vehicle is in motion, support all or part of its weight independently of the wheels.

The chassis 10 may be of any ordinary construction and consists essentially of longitudinal side bars 17 connected by the usual cross-pieces, one of which, 8, is shown in Fig. 3. The chassis 10 is mountel by means of the usual springs 19 on the axles of the wheels 11 and 12. The rear wheels 11 are driven by an engine 20 which may be suspended from the middle part of the chassis as shown or mounted in any other convenient position on the chassis.

The body 13, which provides seats or other accommodations for the passengers, is structurally independent of the chassis. It is attached to the chassis by means which allow it up and down movement with respect to the chassis, but restrain against any material longitudinal or lateral movement with respect to the chassis. In the form shown, the body is attached to the chassis by longitudinal draw bars 21 which are pivoted at their front ends to the side bars 17 of the chassis and at their rear ends to depending brackets 22 on the body, and is suspended on three compression springs 23, 23, 24. Each of the rear compression springs 23 re-acts between the closed outer ends of telescoped cylinders 25, 26. The lower cylinders 25 are pivotally mounted on the side bars of the chassis by trunnions 27 (as shown in Figs. 2 and 4) and the upper cylinders 26 are pivotally attached to vertical braces 28 forming part of the body (as shown in Figs. 2 and 5). The front spring 24 reacts between the end of two similar telescoped cylinders 29, 30. The lower cylinder 29 is pivoted to the front cross-piece 18 of the chassis by means of trunnions 31, and the upper cylinder 30 is secured to the front end of the body 13 by means of a pivot 32 (as shown in Figs. 1 and 3). The strength of the compression springs 23, 23, 24 is sufficient to hold the body 13 out of contact with the chassis 10 when the body contains its normal load. Cooperating stops 32' limit the separation between the body and the chassis.

The aerofoils 14, 15 and 16 are pivoted on standards 33 projecting upwardly from the top of the body. The standards 33 are of graduated height, so as to place each aerofoil higher than the one in front of it. Automatic means are provided for limiting the lifting effect of the aerofoils by reducing their angle of incidence as their lifting effect increases. For this purpose, the rear portions of the aerofoils are connected by rods 34 to one end of levers 35 fulcrumed on the body 13 and having their other ends connected to the chassis 10 by rods 36, 36, 36'. The front aerofoils 16 may also be tipped manually by means of an emergency brake lever 37 which carries an arm 38 having a pin and slot connection 39 with the rod 36'.

In the operation of the vehicle which has been described, easy riding at low speeds is secured by the action of the springs 23, 23, 24 which sustain the body 13 clear of the chassis 10 and cushion such shocks as are not completely absorbed by the springs 19. As the speed of the vehicle increases, the aerofoils 14, 15, 16 exert an increasing lifting effect on the upper part of the body which gives the vehicle great stability and reduces wholly or partly the pressure of the body on the compression springs 23, 24. The automatic controlling means 34, 35, 36 prevent the lifting effect from becoming great enough to injuriously reduce the traction of the wheels 11, 12. When the body is wholly or partly air-borne, it is relieved from all road shocks.

What I claim is:

1. In a road vehicle, a traction wheel supported chassis, a body connected to the chassis to have movement relative to and vertically of the body, an aerofoil adjustably mounted on the body and tending to move the body vertically away from the chassis and air support the body during the travel of the vehicle upon a traction surface, and means connected with the aerofoil, the body and the chassis automatically operative to change the angle of incidence of and maintain constant the lifting effect of the aerofoil with variations in the speed of travel of the vehicle upon the traction surface.

2. In a road vehicle, a traction wheel supported chassis, a body connected to the chassis to have vertical movement from and to the chassis and normally yieldingly supported therefrom, an aerofoil tiltably mounted on the body and adapted to lift and air support the body by the travel of the vehicle upon the traction surface, means connected with the aerofoil, chassis and body operative by the movement of the body relative to the chassis to change the angle of incidence of and maintain the lifting force of the aerofoil constant.

3. In a road vehicle, a traction wheel supported chassis, a body, means to connect the body with the chassis to have vertical movement relative to the chassis, comprising pairs of telescopical tubular members, one member of each pair being connected with the chassis and the other with the body, springs within said tubular members to normally yieldingly support the body from the chassis, an aerofoil tiltably mounted on the body to change the angle of incidence thereof, and means connected with the aerofoil, chassis and body automatically operative to change the angle of incidence of the aerofoil by the movement of the body relative to the chassis.

4. A road vehicle as claimed in claim 3, wherein the tubular members of the connecting means are pivotally connected with the chassis to have movement on axes transversely of the chassis and thereby movement of the body in a direction longitudinally of the chassis, and means to restrain the longitudinal movement of the body while permitting vertical movement thereof.

5. In a motor driven road vehicle, a chassis, driving and steering wheels supporting the chassis, a body, means to connect the body and chassis to yieldingly support the body from the chassis and permit of movement of the body upward away from and toward the chassis, an aerofoil pivotally supported above the body, and connections between the aerofoil body and chassis operative to automatically reduce the angle of incidence of the aerofoil proportional to the movement of the body away from the chassis and an increase in the lifting effect of the aerofoil.

In testimony whereof I have hereunto set my hand.

WOLSTAN C. BROWN.